United States Patent [19]

Krabbenhoft

[11] Patent Number: 5,132,398

[45] Date of Patent: Jul. 21, 1992

[54] PREPARATION OF LINEAR POLYCARBONATES FROM CYCLIC OLIGOMER COMPOSITIONS USING WITTIG SALT OR PRECURSORS THEREOF AS CATALYST

[75] Inventor: Herman O. Krabbenhoft, Scotia, N.Y.

[73] Assignee: General Electric Company, Schenectady, N.Y.

[21] Appl. No.: 656,347

[22] Filed: Feb. 15, 1991

[51] Int. Cl.$^5$ .............................................. C08G 64/20
[52] U.S. Cl. ..................................... 528/371; 528/196; 528/198; 528/370
[58] Field of Search ................ 528/371, 370, 198, 196

[56] References Cited

U.S. PATENT DOCUMENTS 4,707,539 11/1987 Mues et al. ........................... 528/371

OTHER PUBLICATIONS

*Grant and Hackh's Chemical Dictionary*, Fifth Edition, p. 478.

*Primary Examiner*—Harold D. Anderson
*Attorney, Agent, or Firm*—William H. Pittman; James C. Davis, Jr.

[57] ABSTRACT

Cyclic polycarbonate oligomers are polymerized to linear polycarbonates by the catalytic action of a Wittig salt prepared by the reaction of a triarylphosphine with an alkyl or acyl halide. Certain Wittig salt-forming reactants may be incorporated in the cyclic polycarbonate composition, and interreact when the composition is heated to form the active catalytic species.

20 Claims, No Drawings

PREPARATION OF LINEAR POLYCARBONATES FROM CYCLIC OLIGOMER COMPOSITIONS USING WITTIG SALT OR PRECURSORS THEREOF AS CATALYST

This invention relates to the preparation of linear polycarbonates and similar condensation polymers, and more particularly to a method for their preparation from cyclic oligomer compositions.

The conversion of low molecular weight cyclic aromatic carbonate polymers to linear polycarbonates is known. Reference is made, for example, to the following U.S. Pat. Nos.:

3,155,683, 3,386,954, 3,274,214 3,422,119.

More recently, cyclic polycarbonate oligomer mixtures have been prepared and converted to linear polycarbonates, often of very high molecular weight, by contact with a wide variety of polycarbonate formation catalysts. Reference is made, for example, to U.S. Pat. Nos. 4,644,053 and 4,740,583, the disclosures of which are incorporated by reference herein.

Many of the catalysts used to convert cyclic polycarbonates to linear polymers have relatively rapid action. This is, of course, often desirable, since there is frequently nothing gained by prolonging the polymerization reaction.

Under certain conditions, however, it is necessary for the melt viscosity of the cyclic polycarbonate composition to remain relatively low for some time. An example is pultrusion, in which a continuous fiber yarn is impregnated with resinous material or resin precursor(s) and subsequently extruded under conditions which promote curing or polymerization. Maintenance of low melt viscosity for a period sufficient to wet the continuous fibers is required. Thereafter, it is desirable for conversion to linear polycarbonates to be as rapid as possible.

Another such operation is reaction injection molding (RIM), in which two interreactive polymer or polymer precursor streams are charged to a mold which is heated to a temperature at which reaction between said streams takes place to form a molded article. The contents of each stream should be stable and non-reactive within itself. However, reaction between the two streams, resulting in curing or polymerization, should take place promptly upon mixing.

For operations of this type, a two-component catalyst system for polymerization of cyclic polycarbonate oligomers is desired. Such a system is provided by the present invention.

In one of its aspects, therefore, the invention includes a method for preparing a resinous composition which comprises contacting, at a temperature in the range of about 200°–350° C., at least one cyclic polycarbonate oligomer with a catalytic amount of a two-component catalyst precursor system comprising:

(A) at least one halide of the formula

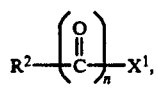  (I)

wherein $R^2$ is an aliphatic or alicyclic radical, $X^1$ is chloro, bromo or iodo and n is 0 or 1, said halide having a boiling point at 760 torr of at least about 150° C.; and (B) at least one triarylphosphine having a $pK_a$ in its protonated form up to about 3.0, said triarylphosphine being capable of reaction with reagent A to form a Wittig salt;

the molar ratio of reagents A and B being in the range of about about 0.2–5.0:1.

The cyclic polycarbonate oligomer compositions useful in the method of this invention generally comprise a plurality of structural units of the formula

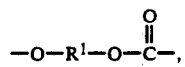  (II)

wherein at least about 60% of the total number of $R^1$ values are divalent aromatic organic radicals, the balance thereof being aliphatic, alicyclic or aromatic organic radicals. Such compositions include dimers, trimers and tetramers, as well as cyclic polycarbonate oligomer mixtures.

The $R^1$ values may be different but are usually the same, and may be aliphatic, alicyclic, aromatic or mixed; those which are aliphatic or alicyclic generally contain up to about 8 carbon atoms. Suitable $R^1$ values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

Preferably at least about 80% of the total number of $R^1$ values in the cyclic oligomer mixtures, and most desirable all of said $R^1$ values, are aromatic. The aromatic $R^1$ radicals preferably have the formula

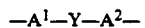  (III)

wherein each of $A^1$ and $A^2$ is a monocyclic divalent aromatic radical and Y is a bridging radical in which one or two atoms separate $A^1$ from $A^2$. The free valence bonds in formula II are usually in the meta or para positions of $A^1$ and $A^2$ in relation to Y.

In formula III, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gemalkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula III is the 2,2-bis(4-phenylene)propane radical, which is derived from bisphenol A and in which Y is isopropylidene and $A^1$ and $A^2$ are each p-phenylene.

The cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

The cyclic oligomer mixtures contain very low proportions of linear oligomers. In general, no more than about 5% of such linear oligomers, if any, are present.

The mixtures also usually contain low percentages, if any, of polymers (linear or cyclic) having a degree of polymerization greater than about 30. For the purposes of this invention, which often require relatively very low viscosities at the temperatures at which the oligomers are liquid, it is usually preferred and sometimes essential for the proportion of such polymers having a high degree of polymerization to be low, generally no higher than about 5%. Removal of such polymers, when necessary, is easily achieved by precipitation with a non-solvent, as disclosed, for example, in the aforementioned U.S. Pat. No. 4,644,053.

According to the present invention, conversion of the cyclic polycarbonates to linear polycarbonates is effected by contact with the above-identified two-component catalyst precursor system. Reagent A therein is at least one halide of formula I, wherein $R^2$ is a primary or secondary aliphatic or alicyclic radical. It may have olefinic unsaturation or aromatic substituents, as illustrated by allyl and benzyl radicals. Included are alkyl-type and acyl-type halides, the latter being compounds in which n is 1. When n is 0, $R^2$ is preferably primary or secondary.

A critical physical property of reagent A is its boiling point, which must be at least about 150° C. at 760 torr (i.e., atmospheric pressure) so as to avoid volatilization at the temperatures of conversion of cyclics to linear polycarbonate. Aliphatic halides having such boiling points generally contain at least 6-7 and preferably at least 8 carbon atoms. The boiling point is preferably at least about 225° C.

While $X^1$ in formula I may be chloro, bromo or iodo, bromo substituents are generally preferred by reason of their favorable reactivity under the conditions of the invention, as well as the superior properties of the polycarbonates prepared. Especially preferred as reagent A are 1-bromoalkanes containing about 10–20 carbon atoms, with 1-bromohexadecane being particularly preferred.

Reagent B is at least one triarylphosphine which, in its protonated form, has a $pK_a$ up to about 3.0. Although $pK_a$ is ordinarily determined in a purely aqueous system, it closely follows $pK_a$, which may be determined in a mixed aqueous-organic system, and which is often easier to determine for the triarylphosphines by reason of their lack of solubility in water. For the purposes of the present invention, $pK_a$ and $pK_a$, are deemed to be equal.

The aryl radical in the triarylphosphine is generally a $C_{6-10}$ radical. Substituted triarylphosphines in which the overall effect of the substituent(s) is electron-withdrawing may be employed, as illustrated by tris(p-fluorophenyl)- and tris(p-chlorophenyl)phosphine. The preferred phosphines under most circumstances are triphenylphosphine and tris(p-fluorophenyl)phosphine, with the former being most preferred by reason of its availability and particular suitability; its $pK_a$ is about 2.7.

It is known in the art that compounds of the type represented by reagents A and B react under proper conditions to form quaternary phosphonium halides, commonly identified as "Wittig salts". Accordingly, another aspect of the invention is a method for converting cyclic polycarbonate oligomers to linear polycarbonates in accordance with the foregoing, by contact with a catalytic amount of at least one Wittig salt of the formula

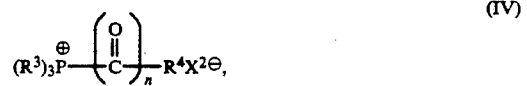

(IV)

wherein $R^3$ is an aliphatic, alicyclic or aromatic radical, $R^4$ is an aliphatic or alicyclic radical, $X^2$ is halo and n is as previously defined.

When a preformed Wittig salt is employed as the catalyst, the parameters of $pK_a$, boiling point and the like which are defined hereinabove are not critical. Therefore, the definition of the Wittig salt of formula IV is considerably broader than the definitions of reagents A and B. It is often preferred to employ a Wittig salt derived from reagent B as previously defined and a $C_{1-20}$ alkyl bromide.

The fact that Wittig salts of formula IV are the effective catalytic species in accordance with the present invention has been demonstrated experimentally. It was shown, first, that a mixture of bisphenol A cyclic polycarbonate oligomers and 0.4 mole percent, based on structural units in said oligomers, of 1-bromohexadecane did not undergo a ring-opening polymerization reaction when heated for 30 minutes at 300° C. Triphenylphosphine, at the same level, caused polymerization to only a slight degree under the same conditions. Tris-p-fluorophenylphosphine when similarly employed did not initiate polymerization. However, a mixture of equimolar amounts of 1-bromohexadecane and triphenylphosphine was shown to initiate polymerization to a degree sufficient to produce a polycarbonate with useful properties. Similar results were obtained with a preformed Wittig salt prepared from 1-bromohexadecane and tris-p-fluorophenylphosphine.

It is apparent from formula IV that the reaction which forms the Wittig salt takes place between equimolar amounts of reagents A and B. It is possible, therefore, to employ said reagents in substantially equimolar amounts in the cyclic polycarbonate oligomer composition to be polymerized. It is frequently preferred, however, to employ one of the two reagents in excess, generally up to a 500% molar excess (i.e. a molar ratio of reagent A to reagent B in the range of about 0.2–5.0:1), in order to drive the salt-forming reaction to completion. The reagent present in excess should generally be reagent A, by reason of its minimal tendency to initiate cyclics polymerization by itself.

The polymerization reaction is typically conducted by merely contacting the cyclic oligomers with the catalyst species (i.e., the Wittig salt) or the precursors thereof (i.e., reagents A and B) at a temperature in the range of about 200°–350° C., preferably about 200°–300° C., until polymerization has proceeded to the extent desired. Although a solvent may be used, it is not necessary and is frequently not preferred. It is within the scope of the invention to conduct the polymerization in a mold to produce a molded article, or in an extruder or pultrusion apparatus to produce a linear polycarbonate with or without reinforcement such as glass fibers.

Compositions comprising cyclic oligomers of formula I and at least one Wittig salt or precursors thereof as described hereinabove may be prepared by dissolving the cyclic compositions in a suitable solvent, preferably methylene chloride, to which the Wittig salt or its precursors are added in the desired proportions. The solvent is then evaporated to reduce an intimate blend of the catalyst constituent(s) and the cyclic composition. Such blend is stable at ambient temperatures but may be polymerized by heating to an appropriate temperature. Polymerizable compositions of this type are another aspect of the invention.

The proportion of catalyst, or precursors thereof, used in the method of this invention will depend to some extent on the molecular weight of the polymer desired and the time available for completion of the polymerization reaction. Since a "living" polymerization is involved, the molecular weight of the polymer will vary inversely with the proportion of catalyst or precursors used. On the other hand, the reaction rate varies directly with the proportion of catalyst. Therefore, as said proportion is increased, the time required for polymerization and the molecular weight of the product both decrease. Balancing these factors, it is generally found that catalyst or precursor proportions of about 0.001–1.0 mole percent, based on structural units in the oligomers, are satisfactory.

The invention is illustrated by the following examples. The cyclic polycarbonate composition used in each example was a mixture of bisphenol A cyclic polycarbonate oligomers, principally having degrees of polymerization from 2 to about 6 and substantially free from linear polycarbonate; molar proportions thereof are in terms of carbonate units. Molecular weights were determined by gel permeation chromatography relative to polystyrene.

EXAMPLE 1

Solutions in methylene chloride of cyclic polycarbonate oligomers and various proportions of 1-bromohexadecane and triphenylphosphine were prepared and evaporated to dryness in vacuum. The resulting dry mixtures were thoroughly pulverized with a spatula and 2.55-gram samples thereof were placed in a flask which was evacuated and heated at 300° C. in a salt bath for 30 minutes. The contents of the flasks were allowed to cool, after which nitrogen and then air were allowed to bleed in. The products were dissolved in 30 ml. of methylene chloride and the solutions were filtered through a cotton plug and allowed to evaporate, whereupon cast polycarbonate films were obtained; they were inspected visually to determine their condition. A second portion of each filtrate was analyzed to determine molecular weight and degree of polymerization. The results are given in Table I.

TABLE I

| Reagent A, mole % | Reagent B, mole % | Polycarbonate Physical condition | Yield, % | Mw | Mw/Mn |
|---|---|---|---|---|---|
| 0.1 | 0.1 | Brittle | 56 | 54,300 | 1.93 |
| 0.1 | 0.2 | Tough | 62 | 47,300 | 1.95 |
| 0.1 | 0.4 | Tough | 62 | 56,800 | 1.99 |
| 0.2 | 0.1 | Tough | 68 | 59,600 | 2.00 |
| 0.2 | 0.2 | Tough | 68 | 50,600 | 2.00 |
| 0.2 | 0.4 | Tough | 66 | 59,700 | 2.00 |
| 0.4 | 0.1 | Tough | 64 | 58,500 | 2.00 |
| 0.4 | 0.2 | Tough | 70 | 49,800 | 1.97 |
| 0.4 | 0.4 | Tough | 83 | 60,300 | 1.99 |

EXAMPLE 2

The procedure of Example 1 was repeated, employing 1-bromohexadecane and triphenylphosphine at 0.1 mole percent each and varying the polymerization time. All of the resulting films were tough; other properties are given in Table II.

TABLE II

| Time, min. | Polycarbonate Yield, % | Mw | Mw/Mn |
|---|---|---|---|
| 5 | 62 | 60,700 | 1.94 |
| 10 | 68 | 67,800 | 1.99 |
| 15 | 67 | 64,100 | 1.96 |
| 20 | 70 | 66,700 | 1.99 |
| 30 | 68 | 66,800 | 1.99 |

The results of this example show that the polymerization reaction is, for all practical purposes, complete after 10 minutes.

EXAMPLE 3

The procedure of Example 2 was repeated, substituting 1-chlorohexadecane for the 1-bromohexadecane. The results are given in Table III.

TABLE III

| Time, min. | Polycarbonate physical condition |
|---|---|
| 5 | Very cracked |
| 10 | Slightly cracked |
| 20 | Very slightly cracked |

The results of this example show that 1-chlorohexadecane is also effective as reagent A, but yields products with somewhat less advantageous properties and requires a somewhat longer reaction time than the bromo analog.

EXAMPLE 4

The procedure of Example 2 was repeated, substituting 1-iodohexadecane for the 1-bromohexadecane. All films were tough; other properties are given in Table IV.

TABLE IV

| Time, min. | Polycarbonate Yield, % | Mw | Mw/Mn |
|---|---|---|---|
| 15 | 57 | 53,900 | 1.94 |
| 30 | 62 | 57,100 | 1.99 |

EXAMPLE 5

The procedure of Example 2 was repeated, substituting 1-bromooctadecane for the 1-bromohexadecane and tris-p-fluorophenylphosphine for the triphenylphosphine. Each catalyst precursor was employed at a level of 0.5 mole percent. The results are given in Table V.

TABLE V

| Time, min. | Polycarbonate | |
| --- | --- | --- |
|  | Yield, % | Mw |
| 5 | 46 | 70,900 |
| 10 | 55 | 73,500 |
| 20 | 57 | 73,500 |

EXAMPLE 6

Following the procedure of Example 1, compositions comprising cyclic polycarbonate oligomers and various proportions of methyltriphenylphosphonium bromide were prepared and polymerized by heating for 5 minutes at 275° C. The results are given in Table 6.

TABLE VI

| Mole % catalyst | Yield, % | Mw |
| --- | --- | --- |
| 0.1 | 50 | 37,000 |
| 0.2 | 51 | 44,500 |
| 0.3 | 65 | 50,500 |
| 0.4 | 66 | 54,400 |
| 0.5 | 67 | 53,300 |

What is claimed is:

1. A method for preparing a resinous composition which comprises contacting, at a temperature in the range of about 200°–350° C., at least one cyclic polycarbonate oligomer with a catalytic amount of a two-component catalyst precursor system comprising:
   (A) at least one halide of the formula

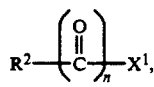
(I)

wherein $R^2$ is an aliphatic or alicyclic radical, $X^1$ is chloro, bromo or iodo and n is 0 or 1, said halide having a boiling point at 760 torr of at least about 150° C., and
   (B) at least one triarylphosphine of the formula $(R^3)_3P$, wherein $R^3$ is an aliphatic, alicyclic or aromatic radical, said triarylphosphine being capable of reaction with component A to form a Wittig salt; the molar ratio of reagent A to reagent B being in the range of about about 0.2–5.0:1.

2. A method according to claim 1 wherein the cyclic polycarbonates comprise a plurality of structural units of the formula

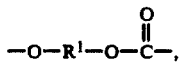
(II)

wherein at least about 60% of the total number of $R^1$ values are divalent aromatic organic radicals, the balance thereof being aliphatic, alicyclic or aromatic organic radicals, 3. A method according to claim 2 wherein the molar ratio of reagents A and B is in the range of about 1–5:1.

4. A method according to claim 3 wherein n is 0.

5. A method according to claim 4 wherein reagent A is a 1-bromoalkane containing about 10–20 carbon atoms and reagent B is triphenylphosphine.

6. A method according to claim 4 wherein each of reagents A and B is present in the amount of about 0.001–1.0 mole percent, based on structural units in the oligomer composition.

7. A method according to claim 4 wherein each $R^1$ radical has the formula $$-A^1-Y-A^2-$$ (III)

wherein each of $A^1$ and $A^2$ is a monocyclic divalent aromatic radical and Y is a bridging radical in which one or two atoms separate $A^1$ from $A^2$.

8. A method according to claim 7 wherein $A^1$ and $A^2$ are each p-phenylene and Y is isopropylidene.

9. A method for preparing a resinous composition which comprises contacting, at a temperature in the range of about 200°–350° C., at least one cyclic polycarbonate oligomer with a catalytic amount of at least one Wittig salt of the formula

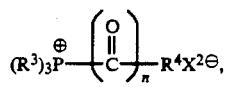
(IV)

wherein $R^3$ is an aliphatic, alicyclic or aromatic radical, $R^4$ is an aliphatic or alicyclic radical, $X^2$ is halo and n is 0 or 1.

10. A method according to claim 9 wherein $R^3$ is phenyl, $R^4$ is a $C_{1-20}$ alkyl radical, $X^2$ is bromo and n is 0.

11. A polymerizable composition comprising cyclic polycarbonate oligomers comprising structural units of the formula

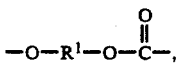
(II)

wherein at least about 60% of the total number of $R^1$ values are divalent aromatic organic radicals, the balance thereof being aliphatic, alicyclic or aromatic organic radicals; and a two-component catalyst system comprising:
   (A) at least one halide of the formula

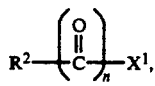
(I)

wherein $R^2$ is an aliphatic or alicyclic radical, $X^1$ is chloro, bromo or iodo and n is 0 or 1, said halide having a boiling point at 760 torr of at least about 150° C.; and
   (B) at least one triarylphosphine of the formula $(R^3)_3P$, wherein $R^3$ is an aliphatic, alicyclic or aromatic radical, said triarylphosphine being capable of reaction with component A to form a Wittig salt; the molar ratio of reagent A to reagent B being in the range of about about 0.2–5.0:1.

12. A composition according to claim 11 wherein the cyclic polycarbonates comprise a plurality of structural units of the formula

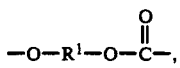  (II)

wherein at least about 60% of the total number of $R^1$ values are divalent aromatic organic radicals, the balance thereof being aliphatic, alicyclic or aromatic organic radicals.

13. A composition according to claim 12 wherein the molar ratio of reagents A and B is in the range of about 1–5:1.

14. A composition according to claim 13 wherein n is 0.

15. A composition according to claim 14 wherein reagent A is a 1-bromoalkane containing about 10–20 carbon atoms and reagent B is triphenylphosphine.

16. A composition according to claim 14 wherein each of reagents A and B is present in the amount of about 0.001–1.0 mole percent, based on structural units in the oligomer composition.

17. A composition according to claim 14 wherein each $R^1$ radical has the formula

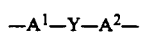 (III)

each of $A^1$ and $A^2$ is a monocyclic divalent aromatic radical and Y is a bridging radical in which one or two atoms separate $A^1$ from $A^2$.

18. A composition according to claim 17 wherein $A^1$ and $A^2$ are each p-phenylene and Y is isopropylidene.

19. A polymerizable composition comprising cyclic polycarbonate oligomers comprising structural units of the formula

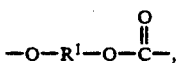 (II)

at least about 60% of the total number of $R^1$ values are divalent aromatic organic radicals, the balance thereof being aliphatic, alicyclic or aromatic organic radicals; and at least one Wittig salt of the formula

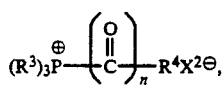 (IV)

wherein $R^3$ is an aliphatic, alicyclic or aromatic radical, $R^4$ is an aliphatic or alicyclic radical, $X^2$ is halo and n is 0 or 1.

20. A composition according to claim 19 wherein $R^3$ is phenyl, $R^4$ is a $C_{1-20}$ alkyl radical, X is bromo and n is 0.

* * * * *